United States Patent [19]

Sakamoto

[11] Patent Number: 4,763,201
[45] Date of Patent: Aug. 9, 1988

[54] IMAGE READOUT APPARATUS
[75] Inventor: Masahiro Sakamoto, Tokyo, Japan
[73] Assignee: Canon Kabushiki Kaisha, Tokyo, Japan
[21] Appl. No.: 827,153
[22] Filed: Feb. 7, 1986
[30] Foreign Application Priority Data
  Feb. 15, 1985 [JP] Japan .................. 60-026419
[51] Int. Cl.⁴ .............................. H04H 1/40
[52] U.S. Cl. .................. 358/282; 358/284; 382/54
[58] Field of Search ......... 358/280, 282, 284, 163; 382/54
[56] References Cited
  U.S. PATENT DOCUMENTS
  4,420,742 12/1983 Tadauchi et al. .......... 358/282
  4,520,395 5/1985 Abe ....................... 358/282

Primary Examiner—Edward L. Coles, Sr.
Attorney, Agent, or Firm—Fitzpatrick, Cella, Harper & Scinto

[57] ABSTRACT

An image readout apparatus includes a readout unit for reading an original image; a storage unit for storing a signal obtained by the readout unit while reading an image having a predetermined reflectance; a hold unit for holding the maximum value of reflectance of the original image while the readout unit reads the original image; and a quantization unit for controlling an output signal level of the storage unit in accordance with the maximum value and quantizing a readout signal of the original image in accordance with the output signal level.

13 Claims, 4 Drawing Sheets

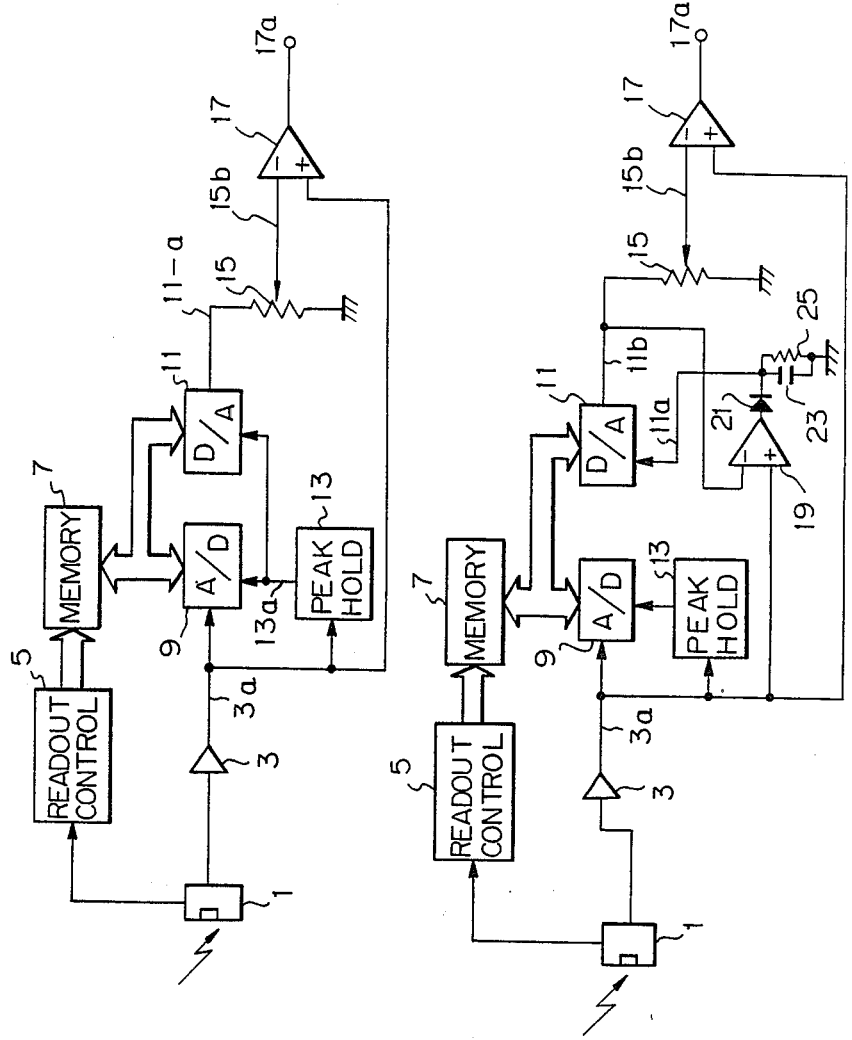

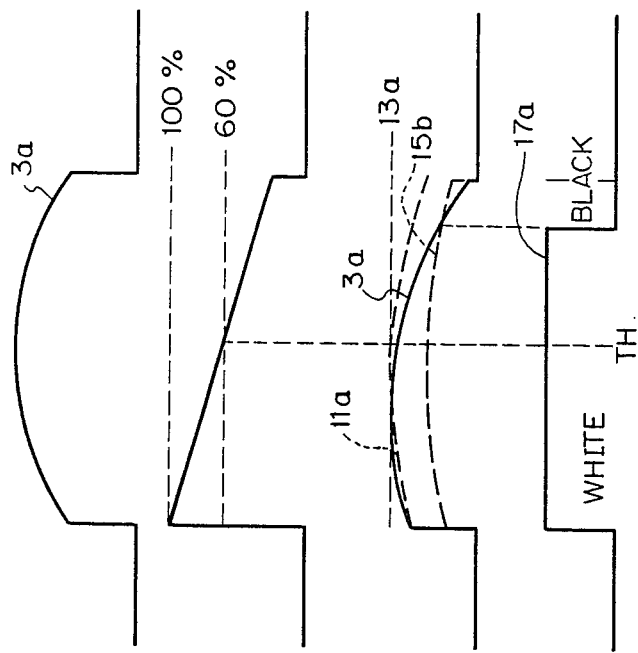
Fig. 2A REFERENCE SURFACE READOUT OUTPUT PRIOR ART
Fig. 2B REFLECTANCE OF ORIGINAL PRIOR ART
Fig. 2C ORIGINAL READOUT OUTPUT PRIOR ART
Fig. 2D COMPARATOR OUTPUT PRIOR ART

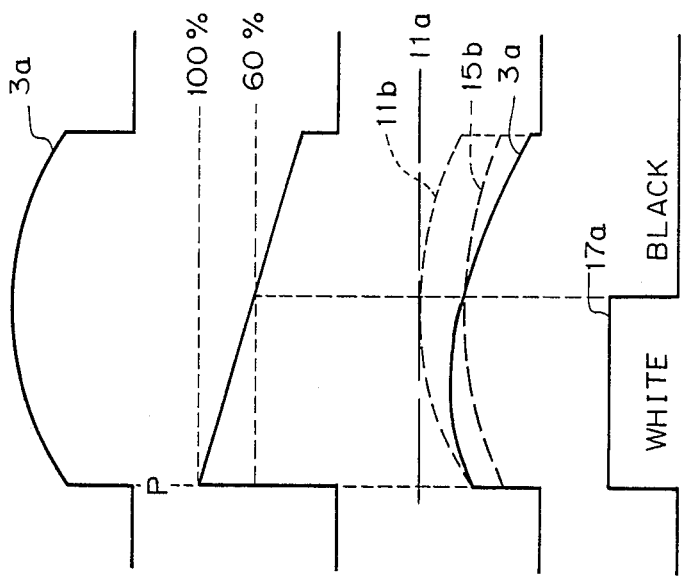
Fig. 4A  REFERENCE SURFACE READOUT OUTPUT
Fig. 4B  REFLECTANCE OF ORIGINAL
Fig. 4C  IMAGE READOUT OUTPUT
Fig. 4D  COMPARATOR OUTPUT

IMAGE READOUT APPARATUS

BACKGROUND OF THE INVENTION

1. Field of the Invention

The present invention relates to an image readout apparatus, and more particularly to an image readout apparatus having an improved, novel shading distortion elimination unit.

2. Description of the Prior Art

An image readout apparatus is commonly used in a presently prevailing facsimile apparatus.

Most of the conventional image readout apparatus have in general a circuit construction as shown in FIG. 1. In the figure, reference numeral 1 represents an image sensor such as a CCD sensor, to which light reflected by an original is applied. The fundamental circuit operation is: reflected light from a predetermined area (one line) of the original is sequentially applied to the image sensor 1 while either the original or the sensor is moved relative to each other; an output from the image sensor 1 is amplified by an amplifier 3 to compare it with a slice level at a variable resistor 15 by a comparator 17; and the comparison result is output as a binary signal.

As is well known in the art, however, since a shading distortion due to scattering of the light quantity of a light source or a readout error due to scattering of a sensor sensitivity may occur, a circuit section shown in the middle portion of the circuit of FIG. 1 is provided. The output of the amplifier 3 is input to an A/D converter 9 and a peak hold circuit 13, the A/D converter 9 converting an output of the amplifier 3 into a digital value of a predetermined number of bits for outputting it to a memory 7. Data in the memory 7 can be restored into analog data through a D/A converter 11. The peak hold circuit 13 holds the maximum value of the read-out signal to supply its output 13a to the A/D converter 9 and D/A converter 11 as their reference values. The analog voltage restored by the D/A converter 11 is applied to variable resistor 15 and hence to the resistor 15 whereat a slice level at the comparator 17 for binarization appears.

Data transfer between the memory 7, A/D converter 9, D/A converter 11 and so on is under control of a readout control unit 5 constructed of a microcomputer and the like.

To compensate for shading distortion and scattering of sensitivity of each element of the image sensor 1 of the image readout apparatus constructed as above, a white reference surface of such as a white reference plate mounted on a preset position of the apparatus is scanned. The output of the image sensor 1 is read and its digital value obtained at the A/D converter 9 is temporarily stored in the memory 7. That is, the memory 7 stores a shading distortion signal. Then, in case of reading an original, data stored in the memory 7 is restored into an analog voltage at the D/A converter 11, which is divided at the variable resistor 15 to use the divided voltage as a slice level for binarization.

In reading an original, an output 13a of the peak hold circuit 13 which corresponds to the maximum brightness at one line of the original is used as a reference voltage of the D/A converter.

FIGS. 2A to 2D show an output waveform obtained by reading a white reference surface, and other voltage waveforms obtained while scanning an original.

FIG. 2A shows an output waveform obtained by reading a white reference surface. The digital values of the output waveform are stored in the memory 7. FIG. 2B shows a reflectance of an actual one-line original. The output 3a of the amplifier 3 corresponding to the reflectance is shown in FIG. 2C by a solid line. The peak hold circuit 13 holds a one-line peak value as shown by a broken line 13a. Based on the peak value 13a, the D/A converter reads the value stored in the memory 7 to obtain a value 11a. In this case, the peak hold value 13a and the output value of the sensor read at its maximum sensitivity position (center position) are not coincident, so that the peak hold value 13a is small. Also, the reference voltage 11a as well as a voltage 15b divided by the variable resistor 15 is small, to accordingly obtain an output of the comparator 17 as shown in FIG. 2D. A slice level for binarization should essentially be at 60% of an original reflectance. But in the above case, the slice level is set at 30 to 40% of the reflectance. According to the prior art, there arises a problem that a correct slice level, which is dependent on the scattering of shading distortion and sensor sensitivity, is not achieved unless the reflectance peak value of an original is obtained along one line at the position where the sensor output is maximum.

For instance, if the maximum output while scanning an original is obtained at the position where shading distortion and sensitivity is maximum (in this case, at the one-line center position of an original), then a correct slice level is obtained. However, as shown in FIG. 2B, if the maximum brightness of an original is at the end of one line of an original and is not obtained at the position where the sensor output is maximum, then the slice level becomes small and a normal binarization cannot be realized.

SUMMARY OF THE INVENTION

The present invention seeks to solve the above prior art problems.

It is an object of the present invention to provide an image readout apparatus capable of quantizing properly and independently of the reflectance distribution of an original.

It is another object of the present invention to provide an image readout apparatus which controls a reference value for quantization in accordance with a quantity of electricity held to correspond not to the maximum value of a readout signal of an original but to a maximum actual reflectance of an original.

It is a further object of the present invention to provide an image readout apparatus which reproduces previously stored shading distortion data while scanning an original and quantizing an original image signal in accordance with the reproduced output, wherein hold means for holding an electrical signal corresponding to the maximum value of reflectance of an original is provided, and the level of said reproduced output is controlled in accordance with said electrical signal.

The objects other than the above of the present invention will become apparent from the following detailed description and the accompanying drawings.

BRIEF DESCRIPTION OF THE DRAWINGS

FIG. 1 is a block diagram showing the circuit construction of a prior art image readout apparatus;

FIGS. 2A to 2D show waveforms for explaining the operation of the apparatus of FIG. 1;

FIG. 3 is a block diagram showing the circuit construction of an embodiment of the image readout apparatus according to the present invention;

FIGS. 4A to 4D show waveforms for explaining the operation of the apparatus of FIG. 3.

DETAILED DESCRIPTION OF THE PREFERRED EMBODIMENTS

Figure 5:
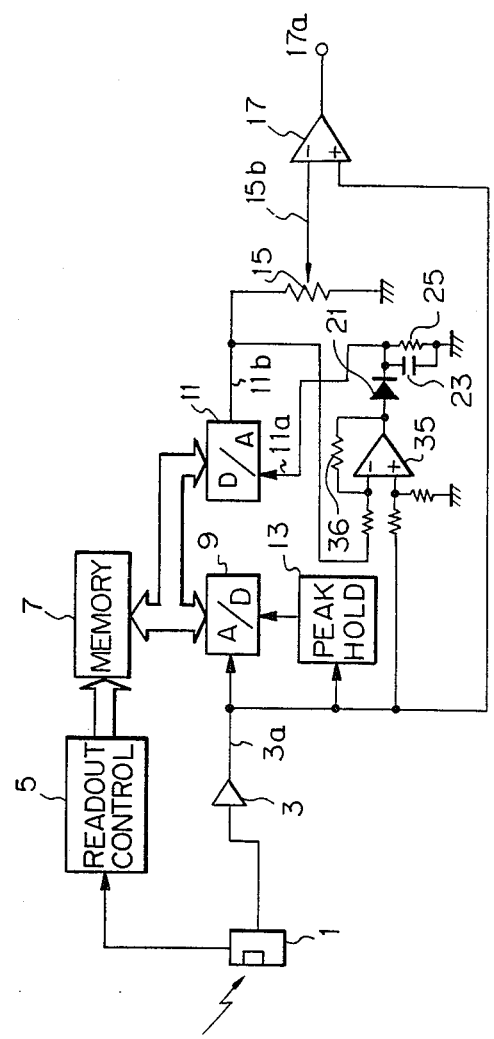
FIG. 5 is a block diagram showing a modification of the apparatus of FIG. 3.

The present invention will now be described in detail in connection with the embodiments shown in the accompanying drawings. In the figures, similar or corresponding elements to those of the prior art apparatus of FIGS. 1 and 2 have been designated by identical reference numerals, and the description therefor has been omitted.

FIG. 3 shows one example of a circuit construction of an image readout apparatus of the present invention. In this embodiment, an output of a linear image sensor 1 is amplified by an amplifier 3 to output an amplified output 3a. The amplified output 3a is inputted to an A/D converter 9, peak hold circuit 13, and to positive input terminal of a comparator 19. An output signal 11b of a D/A converter 11 is inputted to a negative input terminal of the comparator 19.

The output terminal of the comparator 19 is connected to the anode of a diode 21, whose cathode is connected to one ends of a capacitor 23 and resistor 25 whose other ends are grounded. The potential level of the capacitor 23 and resistor 25 is applied to the D/A converter 11 as its reference signal 11a.

The remaining circuit construction is the same as the prior art apparatus, so a detailed description will not given.

With the circuit construction of FIG. 3, first a white reference surface is scanned for compensation of distortion. As similar to the prior art, an output signal obtained while scanning the reference surface is converted into a digital value at the A/D converter 9 to store it in a memory 7. That is, shading distortion data is stored in the memory 7. A predetermined data may be written in the memory 7. In case of scanning an original, the slice level of the comparator 17 at the variable resistor 15 is decided based on a signal corresponding to a distortion and reproduced from the memory 7 via the D/A converter 11 for binarization of an image signal.

In this embodiment, however, in reproducing a signal corresponding to a distortion from the D/A converter 11, a potential level 11a at the capacitor 23 and resistor 25 is used as a reference value of the D/A converter 11.

As shown in FIG. 3, to the positive input terminal of the comparator 19, an image signal 3a corresponding to the output of the image sensor 1 is inputted. To the negative input terminal, an output signal 11b of the D/A converter 11 is inputted. If the level of the output signal 11b of the D/A converter 11 is lower than that of the image signal 3a, then the comparator charges the capacitor 23 to raise the reference voltage. In the opposite case, the charge of the capacitor 23 is discharged via the resistor 25 to drop the reference voltage.

The time constant of discharge defined by the capacitor 23 and resistor 25 is set substantially large. In particular, by setting the discharge time constant at the time required for scanning several main scan lines, the reference value 11a to be applied to the D/A converter 11 is made, as shown in FIG. 4C, approximate to the sensor output level at the position where the sensor sensitivity is maximum. FIGS. 4A to 4D show waveforms for explaining the operation of the apparatus of FIG. 3, wherein the same original was scanned as with FIGS. 2A to 2D. At point P where the original reflection is the highest, the output 11b of the D/A converter 11 becomes substantially equal to the image signal 3a.

More in particular, irrespective of the position of the maximum reflectance in one line of an original, the brightness signal at that position is held by the capacitor 23. Based on the held voltage, the D/A converter 11 determines the slice level thus always enabling an image conversion with a proper slice level.

In the above embodiment, although the comparator 19 has been used as a circuit element for charging the capacitor 23, it may also be possible to use a differential amplifier as shown in FIG. 5 wherein the capacitor 23 is charged in accordance with a difference between the image signal 3a and the output signal 11b of the D/A converter 11. In FIG. 5, reference numeral 35 represents a differential amplifier constructed of such as an operational amplifier, and reference numeral 36 represents a feedback resistor which functions to properly attenuate signals 3a and 11b respectively inputted to the positive and negative input terminals. The amplification is determined, as well known, by the input resistor and feedback resistor.

As apparent from the foregoing description of the present invention, the image readout apparatus for reproducing, while scanning an original, distortion data previously stored in storage means and quantizing an original image signal in accordance with the reproduced output, is provided with hold means for holding an electrical signal corresponding to the maximum value of reflectance of an original and wherein the level of the reproduced output is controlled in accordance with the electrical signal. As a result, irrespective of the position of the peak reflection of an original, a proper slice level irrespective of the scattering of shading distortion and sensor sensitivity can be determined in accordance with the peak value of reflectance. Thus, it is possible to realize an image readout apparatus which can perform a highly reliable quantization in accordance with the slice level thus determined.

The present invention is not intended to be limited to the above embodiments, but various applications and modifications are possible within the scope of appended claims.

What is claimed is:

1. An image readout apparatus comprising:
   reading means for reading an original image;
   storage means for storing a shading distortion wave signal obtained by said reading means while reading an image having a predetermined reflectance;
   shading distortion wave signal reading means for reading the shading distortion wave signal from said storage means while reading the original image;
   variable changing means for variably and totally changing, based on the shading distortion wave signal read out from said shading distortion wave signal reading means and an output of said reading means, a level of the shading distortion wave signal such that the output value of said reading means corresponding to a maximum-reflectance portion of the original image coincides with the shading distortion wave signal; and
   quantizing means for quantizing the output signal of said reading means on the basis of the shading distortion wave signal output from said variable changing means.

2. An image readout apparatus according to claim 1, wherein said variable changing means includes a comparison unit for comparing the shading distortion wave signal of said storage means with the output signal of said reading means and a hold unit for holding the output of said comparison unit for a predetermined time.

3. An image readout apparatus according to claim 2, wherein said reading means reads one line of an original, and said hold unit holds for at least more longer than the time during which said reading means reads one line.

4. An image readout apparatus according to claim 2, wherein said hold unit includes a time constant circuit comprising a capacitor and a resistor.

5. An image readout apparatus according to claim 1, wherein said quantizing means binarizes the output signal of said reading means.

6. An image readout apparatus comprising:
reading means for reading one line of an original image and for outputting an output signal corresponding to image information of the original image;
read control means for controlling said reading means to read an image having a predetermined reflectance prior to reading of the original image;
storage means for storing a shading distortion wave obtained by said reading means while reading the image having the predetermined reflectance;
shading distortion wave signal reading means for reading the shading distortion wave signal from said storage means during reading of the original image;
comparing means for comparing the shading distortion wave signal read out from said shading distortion wave signal reading means with an output from said reading means;
variable changing means for variably and totally changing a level of the shading distortion wave signal on the basis of an output of said comparing means; and
quantizing means for quantizing the output signal of said reading means on the basis of the shading distortion wave signal output from said variable changing means.

7. An image readout apparatus according to claim 6, wherein said variable changing means variably changes the level of the shading distortion wave signal such that the output value of said reading means corresponding to a maximum-reflectance portion of said original image coincides with the shading distortion wave signal.

8. An image readout apparatus according to claim 6, wherein said quantization means binarizes the readout signal of said original image.

9. An image readout apparatus comprising:
reading means for reading an original image;
storage means for storing shading distortion data of said reading means;
shading distortion data reading means for reading the shading distortion data during reading of said original image;
variable changing means, based on the shading distortion data read out from said shading distortion data reading means and an output of said reading means, for variably changing an output level of the shading distortion data such that the output value of said reading means corresponding to a maximum-reflectance portion of said original image coincides with the shading distortion data; and
quantizing means for quantizing the output signal of said reading means based on the output shading distortion data of said variable changing means.

10. An image readout apparatus according to claim 9, wherein said variable changing means includes a comparison unit for comparing the shading distortion data of said storage means with the output signal of said reading means and a hold unit for holding the output of said comparison unit for a predetermined time.

11. An image readout apparatus according to claim 10, wherein said reading means reads one line of an original, and said hold unit holds for at least more longer than the time during which said reading means reads one line.

12. An image readout apparatus according to claim 10, wherein said hold unit includes a time constant circuit comprising a capacitor and a resistor.

13. An image readout apparatus according to claim 9, wherein said quantization means binarizes the output signal of said reading means.

* * * * *

UNITED STATES PATENT AND TRADEMARK OFFICE
CERTIFICATE OF CORRECTION

PATENT NO. : 4,763,201
DATED : August 9, 1988
INVENTOR(S) : MASAHIRO SAKAMOTO

It is certified that error appears in the above-identified patent and that said Letters Patent is hereby corrected as shown below:

COLUMN 1

Line 35, "into analog data" should read --to analog form--.
Line 41, "to the resistor 15 whereat" should read --as--.
Line 42, "binarization appears." should read --binarization.--.
Line 55, "in case" should read --in the case--.

COLUMN 2

Line 50, "It is a further object of" should read --These are attained according to--.
Line 50, "to pro-" should read --by providing--.
Line 51, "vide" should be deleted.
Line 59, "The objects other than the above" should read --These and other objects, features and advantages--.
Line 60, "become apparent" should read --become more fully apparent--.

COLUMN 3

Line 29, "ends" should read --end--.
Line 38, "similar to" should read --in--.
Line 42, "A predetermined" should read --Predetermined--.
Line 43, "memory 7." should read --memory 7 for this purpose.--.

UNITED STATES PATENT AND TRADEMARK OFFICE
CERTIFICATE OF CORRECTION

Page 2 of 2

PATENT NO. : 4,763,201
DATED : August 9, 1988
INVENTOR(S) : MASAHIRO SAKAMOTO

It is certified that error appears in the above-identified patent and that said Letters Patent is hereby corrected as shown below:

COLUMN 4

Line 25, "as well" should read --as is well--.
Line 46, "of appended" should read --of the appended--.

COLUMN 5

Line 11, "more" should be deleted.

COLUMN 6

Line 22, "variably changing" should read --variably and totally changing--.
Line 38, "more" should be deleted.

Signed and Sealed this

Twenty-eighth Day of March, 1989

Attest:

DONALD J. QUIGG

Attesting Officer

Commissioner of Patents and Trademarks